(12) United States Patent
Menges-Flanagan et al.

(10) Patent No.: US 11,667,653 B2
(45) Date of Patent: Jun. 6, 2023

(54) CONTINUOUS METHOD FOR PRODUCING GRIGNARD ADDUCTS AND A DEVICE FOR CARRYING OUT SAME

(71) Applicant: FRAUNHOFER-GESELLSCHAFT ZUR FÖRDERUNG DER ANGEWANDTEN FORSCHUNG E. V., Munich (DE)

(72) Inventors: Gabriele Menges-Flanagan, Oestrich-Winkel (DE); Christian Hofmann, Mainz (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/092,412

(22) PCT Filed: Mar. 29, 2017

(86) PCT No.: PCT/EP2017/057383
§ 371 (c)(1),
(2) Date: Oct. 9, 2018

(87) PCT Pub. No.: WO2017/178230
PCT Pub. Date: Oct. 19, 2017

(65) Prior Publication Data
US 2019/0161505 A1 May 30, 2019

(30) Foreign Application Priority Data

Apr. 13, 2016 (DE) .................... 10 2016 206 211.5

(51) Int. Cl.
*C07F 3/02* (2006.01)
*C07B 49/00* (2006.01)
*B01J 19/00* (2006.01)

(52) U.S. Cl.
CPC ............. *C07F 3/02* (2013.01); *B01J 19/0053* (2013.01); *C07B 49/00* (2013.01)

(58) Field of Classification Search
CPC ........ C07F 3/02; C07B 49/00; B01J 19/0053; B01J 2219/1943; B01J 2219/00033; B01J 2219/00051
See application file for complete search history.

(56) References Cited

U.S. PATENT DOCUMENTS

| 2,066,198 | A | * | 12/1936 | Buc | C07F 3/02 |
| | | | | | 556/101 |
| 2,416,717 | A | * | 3/1947 | Shaw | C07C 17/269 |
| | | | | | 556/186 |
| 2,464,685 | A | * | 3/1949 | Hirsch | C07F 3/02 |
| | | | | | 260/665 G |
| 2,552,676 | A | * | 5/1951 | Hill | C07F 3/02 |
| | | | | | 260/665 G |
| 4,105,703 | A | * | 8/1978 | Motta | C07F 3/02 |
| | | | | | 260/665 G |
| 2002/0161229 | A1 | * | 10/2002 | Bogdanovic | C07F 3/02 |
| | | | | | 546/1 |
| 2014/0142332 | A1 | * | 5/2014 | Ein-Eli | C25B 15/08 |
| | | | | | 556/81 |

FOREIGN PATENT DOCUMENTS

| CA | 2 180 864 A1 | 1/1997 | |
| DE | 195 24 712 A1 | 1/1997 | |
| DE | 199 60 865 A1 | 6/2001 | |
| DE | 19960866 A1 * | 6/2001 | ............. C07B 49/00 |
| DE | 103 04 0006 B3 | 8/2004 | |
| GB | 669756 A | 4/1952 | |
| WO | WO-2010117285 A2 * | 10/2010 | ............... C07F 3/02 |
| WO | WO-2014207206 A1 * | 12/2014 | ............... C07F 3/02 |

OTHER PUBLICATIONS

Baker et al. (J. Org. Chem. 1991, vol. 56, pp. 698-703).*
Phillip Boudjouk, "Synthesis with Ultrasonic Waves", May 1986, Journal of Chemical Education, vol. 63, No. 5, pp. 427-429. (Year: 1986).*
Luche et al., "Ultrasounds in Organic Syntheses. 1. Effect on the Formation of Lithium Organometallic Reagents", 1980, J. Am. Chem. Soc., vol. 102, pp. 7926-7927. (Year: 1980).*
Tuulmets et al. "Influence of sonication on Grignard reagent formation", 1995, Ultrasonics Sonochemistry, vol. 2, No. 2, pp. S75-S78. (Year: 1995).*
Goldman et al., "Starting Recalcitrant Grignard Reactions", Feb. 1986, Journal of Chemical Education, vol. 63, No. 2 (Year: 1986).*
Cravotto et al. ("Simple sonochemical protocols for fast and reproducible Grignard reactions", Green Chemistry., Aug. 2011, vol. 13, Issue 10, pp. 2806-2809) (Year: 2011).*
European Patent Office, International Search Report in International Application No. PCT/EP2017/057383 (dated Jun. 13, 2017).
European Patent Office, Written Opinion in International Application No. PCT/EP2017/057383 (dated Jun. 13, 2017).
International Bureau of WIPO, International Preliminary Report on Patentability in International Application No. PCT/EP2017/057383 (dated Oct. 16, 2018).
China National Intellectual Property Administration, Notification of the First Office Action and Search Report in Chinese Patent Application No. 201780023868.5 (dated Jan. 18, 2021).

* cited by examiner

*Primary Examiner* — Rosalynd A Keys
(74) *Attorney, Agent, or Firm* — Leydig, Voit & Mayer, Ltd.

(57) ABSTRACT

The invention relates to a continuous method for the production of Grignard adducts, in which the magnesium chips are activated mechanically in situ. Furthermore, the invention relates to a device for implementation of the method according to the invention.

20 Claims, 2 Drawing Sheets

CONTINUOUS METHOD FOR PRODUCING GRIGNARD ADDUCTS AND A DEVICE FOR CARRYING OUT SAME

CROSS-REFERENCE TO RELATED APPLICATIONS

This patent application is the U.S. national phase of International Application No. PCT/EP2017/057383, filed on Mar. 29, 2017, which claims the benefit of German Patent Application No. 10 2016 206 211.5, filed Apr. 13, 2016, the disclosures of which are incorporated herein by reference in their entireties for all purposes.

The invention relates to a continuous method for the production of Grignard adducts, in which the magnesium chips are activated mechanically in situ. Furthermore, the invention relates to a device for implementation of the method according to the invention.

There should be understood, according to the invention, by a Grignard adduct a compound of the general formula RMgX, in which R is an alkyl- or aryl radical and X is a halide.

The Grignard reaction is a popular and frequently applied method for linking C—C bonds. The implementation and reaction technique of the Grignard reaction have thereby remained essentially unchanged in the last 100 years.

Normally, the reaction is implemented in a batch method, i.e. a batch or fed-batch process. A great disadvantage hereby is however the long induction phase which is required to activate magnesium. The alkyl- or aryl halides can react with the activated magnesium to form the Grignard compound only after the induction phase. If in fact large quantities of the alkyl- or aryl halides were added for activation of the magnesium, in addition a course of the Grignard adduct formation which is strongly exothermal and can only be controlled with difficulty must be taken into account. This represents a not insignificant risk for the process safety. Furthermore, frequently, undesired secondary reactions occur during the batch methods and, even after complete addition of the halide, agitation must take place again at an increased temperature in order to achieve complete conversion.

Both in the batch methods and in the already known continuous methods, the Grignard reaction must be started with special measures.

Chemical activation of magnesium is known for example from U.S. Pat. No. 2,464,685. Here, the magnesium chips are activated by the addition of an auxiliary reagent or an already produced Grignard compound. In DE 103 04 006 B3, the formation of the Grignard reagent is likewise effected only with the addition of a solution of the halide to be converted or of an iodine solution. Non-chemical measures for activation of magnesium are described in GB 669 756 and DE 195 24 712. GB 669 756 relates to a continuous Grignard reagent synthesis in which the magnesium is divided into fairly small pieces by a cutting device which is installed fixed in the reactor, a fresh, reactive metal surface being produced. In DE 195 24 712, ultrasound is used as activator in reactions between liquid or gaseous and solid reaction partners.

The chemical activation is disadvantageous from a technical procedural point of view since this requires the use of additional materials. The just-mentioned activation measures are, however, complex with respect to apparatus and are not suitable for this reason for large industrial-scale application.

It was therefore the object of the present invention to indicate a method for the production of Grignard adducts which can be implemented continuously and in which the specification for activation of the magnesium does not have the disadvantages known from the state of the art. The activation is intended to be effected in the method mechanically and produced without the use of auxiliary reagents.

Furthermore, it was the object of the present invention to provide a device for implementation of this method, which is simple with respect to apparatus and suitable for various production scales.

This object is achieved by the features of the method and the device described herein, and the advantageous variants thereof.

Figure 1:
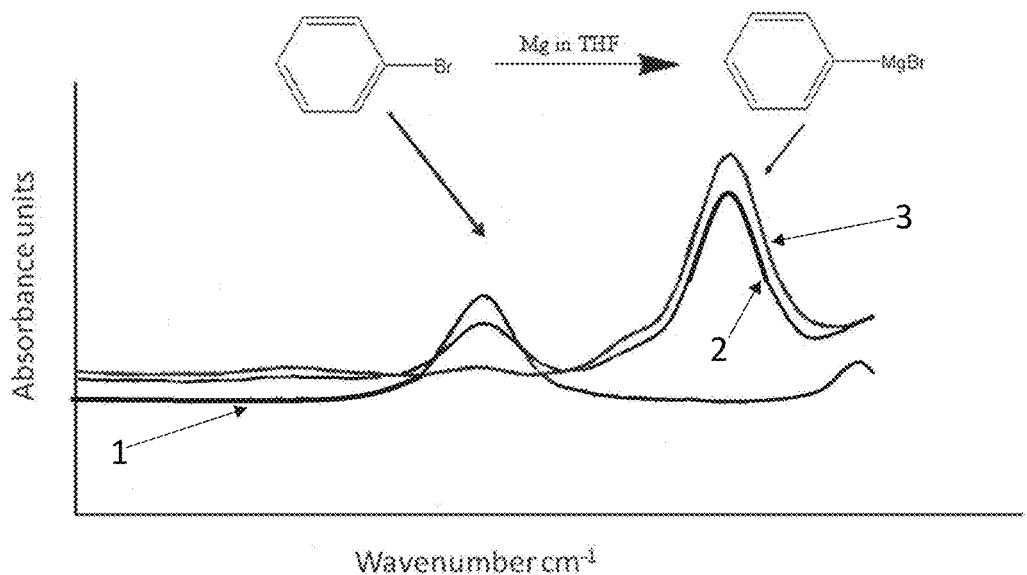
FIG. 1 shows three IR spectra of the reaction mixture form a Grignard adduct, which were recorded at the start-up phase of the reaction (1), after the start-up phase (2), and after achieving complete conversion to form the Grignard adduct (3).

In the continuous method for the production of Grignard adducts, a flow consisting of an alkyl- or aryl halide and a water-free solvent and a further flow consisting of magnesium chips are fed to the reactor. The magnesium chips are thereby activated mechanically in the reactor by friction.

As a result of this method of control, the active Grignard compound can be produced in situ without the addition of further chemicals and can be converted without intermediate storage or time delay. This saves a process step (one unit operation). In addition, no further auxiliary chemicals, as in the case of a chemical activation of magnesium, require to be stored, as a result of which the number of storage containers is reduced.

The method according to the invention enables in addition a truly continuous process management. Whilst it is necessary in many methods from the state of the art to interrupt the process in order to refill with fresh magnesium chips, the magnesium chips in this method are resupplied continuously.

The magnesium chips advantageously have an average size of 0.5 to 3.0 mm.

The mechanical activation of the magnesium chips is achieved, in one method variant, by friction of the magnesium chips against each other, preferably by friction triggered by vibrations, grinding movements, particularly preferably by friction triggered by vibrations with a frequency of 20 to 200 Hz.

By friction of the magnesium chips against each other, the passivation layer which is located on the surface of the chips, is removed. No further measures for activation of the magnesium are required. In particular the addition of auxiliary chemicals can be dispensed with. Contamination of the Grignard compound or of the Grignard adduct can thus be excluded. Purity and quality of the product are accordingly improved.

The water-free solvent consists preferably of an ether, particularly preferably diethyl ether, 2-methyl-tetrahydrofuran, tetrahydrofuran, the mixtures thereof or mixtures thereof with other organic solvents, in particular toluene.

The reactor is temperature-controlled, in one embodiment of the invention, at a temperature of 10 to 60° C., preferably of 25 to 50° C., particularly preferably of 30 to 40° C.

As a result of the low to moderate reaction temperatures, the reaction can be implemented in a controlled manner. The danger of an energy input resulting, which considerably increases the reaction rate in an undesired manner, is low.

In addition, the alkyl- or aryl halide should be supplied to the reactor, preferably in a concentration of 0.5 mol/l to 5.0 mol/l, particularly preferably in a concentration of 1.0 to 3.0 mol/l.

The high concentrations contribute to expenditure being able to be reduced. Less solvent than in comparable methods from the state of the art is required.

The average dwell time of the reagents in the reactor should be preferably in the range of 1.0 to 20.0 minutes, particularly preferably of 3.0 to 15.0 minutes, very particularly preferably of 5.0 to 10.0 minutes.

As a result of the short dwell times, it is also ensured without the use of an agitator that the reaction mixture is well mixed throughout. Every volume element is exchanged regularly and no dead zones result.

The magnesium chips are advantageously fed in such that a molar excess of the magnesium chips is present in the reactor, relative to the alkyl- or aryl halide, preferably an at least 5-times molar excess, particularly preferably an at least 15-times molar excess, in particular an at least 25-times molar excess.

The method is preferably characterised in that the alkyl- or aryl halide used is converted at the output of the reactor up to at least 90%, preferably up to at least 95%, particularly preferably up to at least 99%, to the Grignard adduct or with an electrophilic educt fed in addition to the reactor, selected from the group consisting of aldehydes, ketones, carboxylic acid esters, thioesters, boronic acid esters, nitriles, imines, epoxides, disulphides, carbon dioxide, further alkyl- or aryl halides or other compounds which comprise active hydrogen or polar double bonds, and mixtures hereof.

By means of the use of the large magnesium excess in conjunction with the in situ activation of the magnesium, also comparatively inert aryl- and alkyl chlorides can be used for preparing the Grignard compound. This implies a significant potential in savings since aryl- and alkyl chlorides in most cases are easier to procure than the comparable aryl- and alkyl bromides.

In addition, undesired secondary reactions can be suppressed by the high excess of magnesium. Coupling of educt and product is effectively reduced.

The device for the production of Grignard adducts comprises a reactor with at least one temperature-control device, at least two supply lines and an outlet, a device for mechanical activation and a device for continuous conveyance of the magnesium chips, at least one magnesium storage container and also at least one pump for conveying the alkyl- or aryl halide.

The device for mechanical activation of the magnesium chips advantageously consists of a shaker, a vibration- and/or a grinding device and is fitted on or in the reactor or effectively connected to it for introducing the shaking or vibration movement.

The reactor, in one embodiment variant of the invention, has connections and/or viewing windows for analysis devices and/or sensors, in particular for inline temperature sensors, pressure sensors and/or optical analysis- and display devices.

Thus the purity of the compounds can be followed spectroscopically and online quality control can be effected. In addition, the actual values for pressure, temperature can be established and can be fed into the corresponding control circuits for controlling the method as reference value.

The reactor should in addition have preferably a cylindrical reaction interior, particularly preferably a reaction interior with a geometric ratio of height:diameter of 3:1 to 8:1, particularly preferably a reaction interior with a geometric ratio of height:diameter of 4:1 to 6:1.

With respect to the material, it is preferred if the reactor consists of metal, particularly preferably of stainless steel.

As a result, it has high resistance to corrosive substances. These can be contained either in the educts or products or be present as intermediate products in the Grignard reaction.

The method according to the invention is intended to be explained in more detail with reference to the subsequent example and the appended Figures without wishing to restrict said method to the embodiment which is produced therefrom.

Test Specification, by Way of Example:

In a 3D sintered reactor, 15 g of fresh, untreated magnesium chips are introduced. Subsequently, the supply lines and a thermostat are connected to the reactor. Furthermore, a vibration motor is fitted to the reactor. By switching on the vibration motor, the magnesium chips in the interior of the reactor are firstly compacted. The reactor is in addition pre-temperature-controlled to a temperature of 55° C. by the thermostat in order to enable rapid starting of the Grignard adduct formation. Then a water-free solution of phenyl bromide in tetrahydrofuran with a concentration of 1 mol/l is introduced into the reactor. For conveyance of the solution, an injection pump is used and the flow rate is adjusted to 2 ml/min.

At intervals of a few minutes, inline, infrared spectra are recorded in order to be able to observe the reaction course. Even the first spectrum shows a peak which is attributed to the Grignard compound. The reaction has therefore started immediately. Complete conversion is achieved after 15 min running time.

During the start-up phase, typically an increase in the temperature is observed. The position of the temperature maximum is thereby dependent upon the filling level with magnesium chips. If the temperature in the start-up phase in the reactor increases above the thermostat temperature, slight boiling of the solvent THF is observed. The thermostat is then adjusted correspondingly to a lower temperature.

FIG. 1 shows the reaction equation and three IR spectra which were recorded at the beginning of the test, after the start-up phase and after achieving complete conversion.

Figure 2:
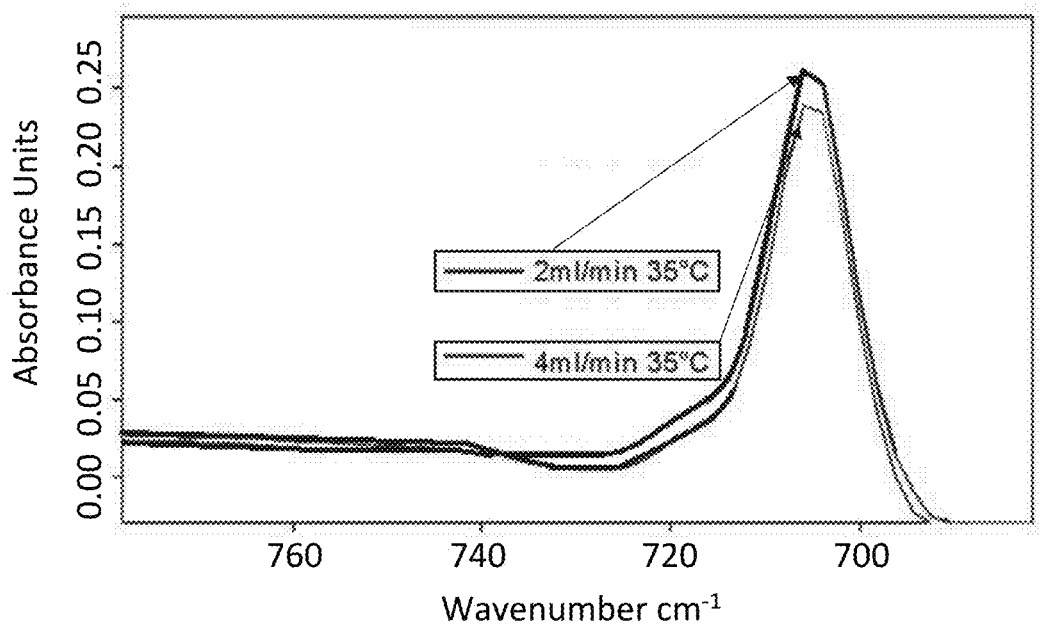
FIG. 2 shows that decreasing the flow rate of the phenyl bromide at 35° C. increased its conversion.

By varying the flow rate and the temperature, the process can be optimised. In can be seen in FIG. 2 that, when doubling the flow rate and reducing the temperature to 35° C., incomplete conversion is observed.

Figure 3:
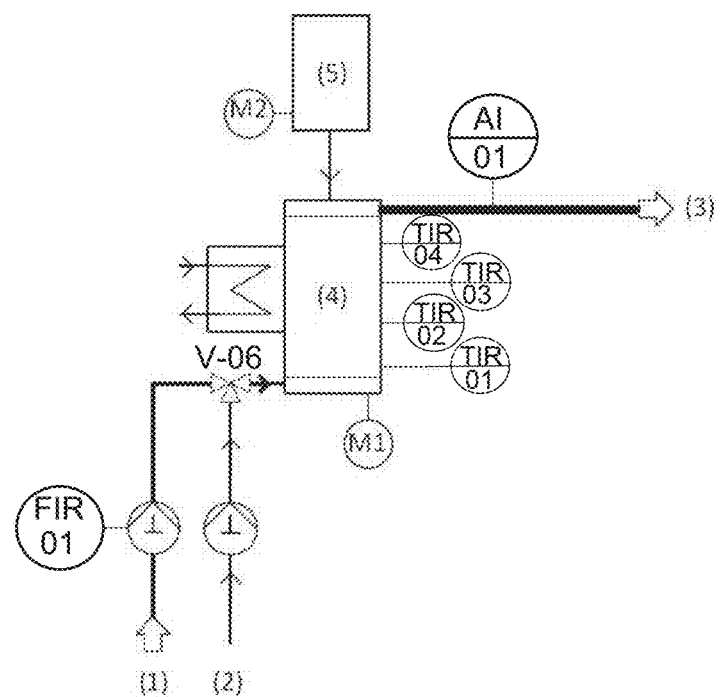
FIG. 3 shows a flow diagram for implementing the method according to the invention and shows the flow rate and temperature measuring instruments (FIR 01 and TIR 01-04), analysis- or display devices that can be used for implementing the method, and the locations where these devices are placed.

FIG. 3 shows a flow diagram for the method according to the invention and shows which measuring instruments, analysis- or display devices can be used for implementing the method and at which positions these are fitted. In addition, it is shown that the educts are introduced preferably from the bottom into the reactor 4. The alkyl- or aryl halide solution is conveyed through the supply line 1 with the help of a pump. In addition, possibly an electrophilic compound can be conveyed into the reactor 4 via the supply line 2. The magnesium chips are stored in a storage container 5 above the reactor 4. A device for continuous conveyance of the magnesium chips M2 is fitted on the storage container 5, whilst, on the reactor 4, a device for mechanical activation of the magnesium chips M1 is fitted. The Grignard adduct or reaction product is removed from the upper part of the reactor 4 in the line 3. The apparatus is characterised by the fact that the magnesium chips in the reactor chamber drop downwards counter to the flow direction of the solution and form a layer there in which the chips abut against each other and, by a shaking movement, friction between the chips is produced.

The invention claimed is:

1. A continuous method for producing a Grignard adduct, wherein said continuous method is conducted in only one reactor, wherein a flow consisting of an alkyl- or aryl halide and a water-free solvent and a further flow consisting of magnesium chips are fed to the reactor such that the magnesium chips drop downwards and form a packed bed in which the chips abut each other, wherein the magnesium chips are fed such that a molar excess of the magnesium chips is present in the reactor relative to the alkyl-or aryl halide, the average dwell time of reagents in the reactor is 1.0 to 20.0 minutes, and the magnesium chips are activated mechanically in the reactor, without utilizing an agitator, but by friction of the magnesium chips against each other triggered by vibrations such that a passivation layer or passivation layers located on a surface of the magnesium chips is/are removed, said vibrations further causing compaction of the activated magnesium chips, and wherein a degree of conversion of the alkyl- or aryl halide to a Grignard adduct at an output of the reactor is at least 90%, wherein the continuous method does not utilize ultrasound to activate the magnesium chips.

2. The method according to claim 1, wherein the magnesium chips have an average size of 0.5 to 3.0 mm.

3. The method according to claim 1, wherein the solvent consists of an ether or a mixture of ethers.

4. The method according to claim 3, wherein the ether is diethyl ether, 2-methyl-tetrahydrofuran, tetrahydrofuran, or a mixture thereof.

5. The method according to claim 1, wherein the reactor is temperature-controlled at a temperature of 10 to 60° C.

6. The method according to claim 1, wherein the alkyl- or aryl halide is fed to the reactor in a concentration of 0.5 mol/l to 5.0 mol/l.

7. The method according to claim 1, wherein the molar excess is at least 5-times molar excess.

8. The method according to claim 1, wherein an electrophilic educt is fed in addition to the reactor, wherein said electrophilic educt is selected from the group consisting of aldehydes, ketones, carboxylic acid esters, thioesters, boronic acid esters, nitriles, imines, epoxides, disulphides, carbon dioxide, further alkyl- or aryl halides or other compounds which comprise active hydrogen or polar double bonds, and mixtures thereof.

9. The method according to claim 1, wherein the average dwell time of reagents in the reactor is 5.0 to 10.0 minutes.

10. The method according to claim 1, wherein the reactor is temperature-controlled at a temperature of 30 to 40° C.

11. A continuous method for producing a Grignard adduct, wherein said continuous method is conducted in only one reactor, wherein the reactor is temperature- controlled at a temperature of 10° C. to 60° C., wherein a flow consisting of an alkyl- or aryl halide and a water-free solvent and a further flow consisting of magnesium chips are fed to the reactor such that the magnesium chips drop downwards and abut each other to form a packed bed, wherein the magnesium chips are fed such that a molar excess of the magnesium chips is present in the reactor relative to the alkyl- or aryl halide, the average dwell time of reagents in the reactor is 1.0 to 20.0 minutes, and the magnesium chips are activated mechanically in the reactor, without utilizing an agitator, by friction of the magnesium chips against each other triggered by vibrations which create a wobbling motion of the magnesium chips such that a passivation layer or passivation layers located on a surface of the magnesium chips is/are removed and further cause a compaction of the activated magnesium chips, and wherein a degree of conversion of the alkyl- or aryl halide to a Grignard adduct at an output of the reactor is at least 90%, wherein the continuous method does not utilize ultrasound to activate the magnesium chips.

12. The method according to claim 11, wherein the magnesium chips have an average size of 0.5 to 3.0 mm.

13. The method according to claim 11, wherein the water-free solvent consists of an ether or a mixture of ethers.

14. The method according to claim 13, wherein the ether is diethyl ether, 2-methyl-tetrahydrofuran, tetrahydrofuran, or a mixture thereof.

15. The method according to claim 11, wherein the molar excess is at least 5-times molar excess.

16. The method according to claim 11, wherein an electrophilic educt is fed in addition to the reactor, wherein said electrophilic educt is selected from the group consisting of aldehydes, ketones, carboxylic acid esters, thioesters, boronic acid esters, nitriles, imines, epoxides, disulphides, carbon dioxide, further alkyl- or aryl halides or other compounds which comprise active hydrogen or polar double bonds, and mixtures thereof.

17. The method according to claim 1, wherein the vibrations have a frequency of 20 Hz to 200 Hz.

18. The method according to claim 1, wherein the reactor is made of a metal.

19. The method according to claim 1, wherein the reactor comprises a device for mechanical activation of the magnesium chips, which device consists of a shaker, a vibration- and/or a grinding device and is fitted on or in the reactor or effectively connected to it for introducing the shaking or vibration movement.

20. The method according to claim 1, wherein the flow fed to the reactor consists of an aryl halide and a water-free solvent, the magnesium chips are fed such that a molar excess of the magnesium chips is present in the reactor relative to the aryl halide, the average dwell time of reagents in the reactor is 1.0 to 20.0 minutes, and the magnesium chips are activated mechanically in the reactor, without utilizing an agitator, but by friction of the magnesium chips against each other triggered by vibrations such that a passivation layer or passivation layers located on a surface of the magnesium chips is/are removed, said vibrations further causing compaction of the activated magnesium chips, and wherein a degree of conversion of the aryl halide to a Grignard adduct at an output of the reactor is at least 90%.

* * * * *